US012698430B2

(12) United States Patent
Hirosue et al.

(10) Patent No.: US 12,698,430 B2

(45) Date of Patent: Aug. 4, 2026

(54) COOLANT WITH LOW ELECTRICAL CONDUCTIVITY

(71) Applicant: BASF SE, Ludwigshafen am Rhein (DE)

(72) Inventors: Masayuki Hirosue, Ludwigshafen (DE); Itamar Michael Malkowsky, Ludwigshafen (DE); Uwe Nitzschke, Ludwigshafen (DE); Nina Schindler, Ludwigshafen (DE); Harald Dietl, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 792 days.

(21) Appl. No.: 18/042,619

(22) PCT Filed: Aug. 24, 2021

(86) PCT No.: PCT/EP2021/073349

§ 371 (c)(1),
(2) Date: Feb. 23, 2023

(87) PCT Pub. No.: WO2022/043303

PCT Pub. Date: Mar. 3, 2022

(65) Prior Publication Data

US 2024/0352300 A1 Oct. 24, 2024

(30) Foreign Application Priority Data

Aug. 26, 2020 (EP) .................................... 20192954

(51) Int. Cl.

| | |
|---|---|
| ***C09K 5/20*** | (2006.01) |
| ***C23F 11/12*** | (2006.01) |
| ***C23F 11/14*** | (2006.01) |
| ***C23F 11/167*** | (2006.01) |
| ***H01M 8/04029*** | (2016.01) |

(52) U.S. Cl.

CPC .............. *C09K 5/20* (2013.01); *C23F 11/126* (2013.01); *C23F 11/141* (2013.01); *C23F 11/149* (2013.01); *C23F 11/1676* (2013.01); *H01M 8/04029* (2013.01); *H01M 2250/20* (2013.01)

(58) Field of Classification Search

CPC ... C09K 5/10; C09K 5/20; C23F 11/08; C23F 11/10; C23F 11/124; C23F 11/126; C23F 11/141; C23F 11/142; C23F 11/149; C23F 11/1676

USPC .......... 252/71, 73, 77, 78.1, 78.3, 79, 389.2, 252/389.23, 389.31, 392, 394

See application file for complete search history.

(56) References Cited

U.S. PATENT DOCUMENTS

| | | | | |
|---|---|---|---|---|
| 3,849,433 | A | 11/1974 | Butula et al. | |
| 4,460,478 | A * | 7/1984 | Mohr | C09K 5/20 252/78.3 |
| 5,000,866 | A * | 3/1991 | Woyciesjes | C09K 5/20 252/78.3 |
| 5,223,164 | A * | 6/1993 | Kanamori | C10M 173/02 508/249 |
| 5,633,222 | A * | 5/1997 | Skold | C10M 173/00 508/561 |
| 7,588,695 | B2 * | 9/2009 | Wenderoth | C09K 5/20 252/75 |
| 9,080,093 | B2 * | 7/2015 | Dietl | C09K 5/20 |
| 2004/0129920 | A1 * | 7/2004 | Wenderoth | H01M 8/04029 252/71 |
| 2005/0051754 | A1 * | 3/2005 | Maes | C09K 5/10 252/70 |
| 2007/0001150 | A1 * | 1/2007 | Hudgens | C23F 11/10 252/390 |
| 2007/0034825 | A1 | 2/2007 | Wenderoth et al. | |
| 2007/0075120 | A1 | 4/2007 | Yang et al. | |
| 2007/0152191 | A1 * | 7/2007 | Trahan | C09K 5/10 252/388 |
| 2014/0224193 | A1 | 8/2014 | Dietl et al. | |
| 2019/0352553 | A1 * | 11/2019 | Dietl | H01M 10/625 |

FOREIGN PATENT DOCUMENTS

| | | | | |
|---|---|---|---|---|
| CN | 1726269 | A | 1/2006 | |
| CN | 101015084 | | 8/2007 | |
| CN | 110023451 | A | 7/2019 | |
| DE | 1948794 | A1 | 4/1971 | |
| JP | 56032581 | A * | 4/1981 | |
| KR | 20190041997 | A | 4/2019 | |
| KR | 20190086713 | A | 7/2019 | |
| WO | 02/101848 | | 12/2002 | |
| WO | WO-03074626 | A1 * | 9/2003 | C09K 5/20 |
| WO | WO-2011089322 | A1 * | 7/2011 | C09K 5/20 |
| WO | WO-2018/013630 | A1 | 1/2018 | |
| WO | 2018/095759 | | 5/2018 | |

OTHER PUBLICATIONS

European Search Report for EP Patent Application No. 20192954.4, Issued on Feb. 26, 2021, 4 pages.

(Continued)

*Primary Examiner* — Matthew R Diaz

(74) *Attorney, Agent, or Firm* — Grüneberg Global IP, PLLC

(57) ABSTRACT

Coolants with low electrical conductivity and corresponding coolant concentrates are useful for cooling systems of vehicles with electric engines, fuel cells, or hybrid engines with a combination of combustion engines with electric engines or a combination of combustion engines with fuel cells.

20 Claims, No Drawings

(56) References Cited

OTHER PUBLICATIONS

International Preliminary Report on Patentability for PCT/EP2021/073349, Issued Feb. 28, 2023, 8 pages.
International Search Report dated Dec. 22, 2021, in PCT/EP2021/073349, 3 pages.
Written Opinion dated Dec. 22, 2021, in PCT/EP2021/073349, 6 pages.
Office Action received for Korean Patent Application No. 10-2023-7006285, mailed on Apr. 4, 2025, 12 pages.

* cited by examiner

COOLANT WITH LOW ELECTRICAL CONDUCTIVITY

CROSS-REFERENCE TO RELATED APPLICATIONS

This application is a National Stage entry under § 371 of International Application No. PCT/EP2021/073349, filed on Aug. 24, 2021, and which claims the benefit of priority to European Application No. 20192954.4, filed on Aug. 26, 2020. The content of each of these applications is hereby incorporated by reference in its entirety.

BACKGROUND OF THE INVENTION

Field of the Invention

The present application describes coolants with low electrical conductivity, the corresponding coolant concentrates, and the use of such coolants in cooling systems of vehicles with electric engines, fuel cells or hybrid engines with a combination of combustion engines with electric engines or a combination of combustion engines with fuel cells.

Description of Related Art

WO 02/101848 discloses coolants comprising azole derivatives and orthosilicates for cooling of fuel-cell drives. The thus disclosed coolants do not contain any acids or amines since this would raise their electrical conductivity. A low conductivity, however, is crucial for such coolants in order to prevent a short circuit of the electrodes and to improve the safety features of the cooling system.

The disadvantage is that such coolants in order to keep the electrical conductivity low do not contain any alkaline constituents which are necessary to neutralise acidic degradation products which otherwise may lead to corrosion.

WO 2018/095759 discloses coolants comprising azole derivatives, orthosilicates, and, optionally, alkoxylated amines for cooling of fuel-cell drives.

The alkoxylated amines are used as anti-corrosion inhibitors against corrosion of iron- or copper-containing alloys. The thus disclosed coolants do not contain any carboxylic acids since this would raise their electrical conductivity. Organic carboxylic acids, especially sebacic acid and terephthalic acid, are known to be effective corrosion inhibitors of aluminium, copper, and brass. Hence, coolants not containing such organic carboxylic acids due to their otherwise electrical conductivity-raising properties usually lack good anti-corrosion properties for these metals.

SUMMARY OF THE INVENTION

Therefore, it was an object of the present invention to provide coolants which exhibit an electrical conductivity low enough so that the respective coolants are suitable for use in vehicles with an electrical drive.

The object was achieved by coolants, comprising (A) at least one glycol (B) water (C) at least one azole derivative (D) at least one ester of orthosilicic acid or alkoxy alkylsilane (E) at least one tertiary amine bearing at least one 2-hydroxyethyl- or 2-hydroxypropyl-group (F) at least one monocarboxylic acid (G) optionally at least one silicophosphonate (H) optionally at least one further coolant additive wherein the molar ratio between tertiary amine (E) and monocarboxylic acid (F) is from 1:0.1 to 1:0.6 components (C) to (H) are present in amounts so that the coolant exhibits an electrical conductivity of less than 100, preferably less than 50, and more preferably less than 45 μS/cm.

Such coolants exhibit both, a low electrical conductivity which makes them usable as coolants for vehicles with an electrical drive and good anti-corrosion properties. The presence of the at least one monocarboxylic acid (F) usually increases the electrical conductivity of the coolant, however, provides an advantage in corrosion inhibition so that the increase of the electrical conductivity is acceptable.

DETAILED DESCRIPTION OF THE INVENTION

Details to the constituents are as follows:

Glycol (A)

As alkylene glycol component or derivative thereof (A), it is possible to use, in particular, monoethylene glycol, diethylene glycol, triethylene glycol, tetraethylene glycol and mixtures thereof, but also monopropylene glycol, dipropylene glycol and mixtures thereof, 1,3-propanediol, higher poly alkylene glycols, alkylene glycol ethers, for example monoethylene glycol monomethyl ether, diethylene glycol monomethyl ether, triethylene glycol monomethyl ether, tetraethylene glycol monomethyl ether, monoethylene glycol monoethyl ether, diethylene glycol monoethyl ether, triethylene glycol monoethyl ether, tetraethylene glycol monoethyl ether, monoethylene glycol mono-n-butyl ether, diethylene glycol mono-n-butyl ether, triethylene glycol mono-n-butyl ether and tetraethylene glycol mono-n-butyl ether, or glycerol, in each case either alone or as mixtures thereof.

Water (B)

Water used for the coolants according to the present invention should be ion-free, designating water with a neutral pH-value and comprising essentially no further ions than those hydroxide ions and hydronium ions out of the autoprotolysis of water at the respective temperature.

The electrical conductivity (throughout this text determined according to ASTM D 1125) at 25° C. of the ion-free water used should preferably not exceed 5 μS/cm, more preferably not more than 3, even more preferably not more than 2, and especially not more than 1 μS/cm.

The ion-free water used can be pure distilled or twice-distilled water or water which has been deionized, for example by ion exchange.

Azole Derivatives (C)

Azole derivatives in the context of the present invention mean five-membered heterocyclic compounds having 2 or 3 heteroatoms from the group consisting of nitrogen and sulfur and comprise no or at most one sulfur atom and can bear an aromatic or saturated six-membered fused-on ring.

These five-membered heterocyclic compounds (azole derivatives) usually contain two N atoms and no S atom, 3 N atoms and no S atom or one N atom and one S atom as heteroatoms.

Preferred groups of the specified azole derivatives are annellated imidazoles and annellated 1,2,3-triazoles of the general formula (I)

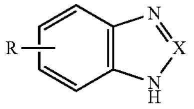

or (II)

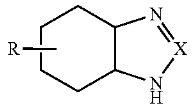

where the variable R is hydrogen or a $C_1$-$C_{10}$-alkyl radical, in particular methyl or ethyl, and the variable X is a nitrogen atom or the C—H group.

Typical and preferred examples of azole derivatives of the general formula (I) are benzimidazole (X═C—H, R═H), benzotriazoles (X═N, R═H) and tolutriazole (tolyltriazole) (X═N, R═$CH_3$). A typical example of an azole derivative of the general formula (II) is hydrogenated 1,2,3-tolutriazole (tolyltriazole) (X═N, R═$CH_3$).

A further preferred group of the specified azole derivatives is benzothiazoles of the general formula (III)

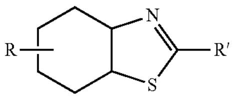

where the variable R is as defined above and the variable R' is hydrogen, a $C_1$-$C_{10}$-alkyl radical, in particular methyl or ethyl, or in particular a mercapto group (—SH). A typical example of an azole derivative of the general formula (III) is 2-mercaptobenzothiazole.

It is also possible, however less preferable, to use (2-benzothiazylthio)acetic acid (R'═—S—$CH_2$—COOH) or (2-benzothiazylthio) propionic acid (R'═—S—$CH_2$—$CH_2$—COOH). This embodiment is less preferable since the use of such free-acid compounds would increase the electrical conductivity of the coolant.

Further suitable azole derivatives are non-annellated azole derivatives of the general formula (IV)

(IV)

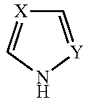

where the variables X and Y together are two nitrogen atoms or one nitrogen atom and a C—H group, for example 1H-1,2,4-triazole (X=Y=N) or preferably imidazole (X═N, Y═C—H).

For the purposes of the present invention, benzimidazole, benzotriazole, tolutriazole, hydrogenated tolutriazole or mixtures thereof, in particular benzotriazole or tolutriazole, are very particularly preferred as azole derivatives.

The azole derivatives mentioned are commercially available or can be prepared by conventional methods. Hydrogenated benzotriazoles such as hydrogenated tolutriazole are likewise obtainable as described in DE-A 1 948 794 and are also commercially available.

Esters of Orthosilicic Acid or Alkoxy Alkylsilanes (D)

Esters of orthosilicic acid are compounds of the formula $$Si(OR^1)_4$$

wherein $R^1$ is an organic substituent comprising 1 to 6 carbon atoms, for example a linear or branched, preferably a linear alkyl substituent comprising 1 to 6 carbon atoms or an aromatic substituent comprising 6 carbon atoms, more preferably an alkyl substituent comprising 1 to 4 carbon atoms and even more preferably an alkyl substituent comprising 1 or 2 carbon atoms.

Alkoxy alkylsilanes are less preferred and both the alkoxy substituent as well as the alkyl group comprise a linear or branched, preferably a linear alkyl substituent comprising 1 to 6 carbon atoms, more preferably an alkyl substituent comprising 1 to 4 carbon atoms and even more preferably an alkyl substituent comprising 1 or 2 carbon atoms.

Typical examples of compounds (D) are tetraalkoxysilanes, preferably tetramethoxysilane and tetraethoxysilane, and alkoxyalkylsilanes, preferably triethoxymethylsilane, diethoxydimethylsilane, ethoxytrimethylsilane, trimethoxymethylsilane, dimethoxydimethylsilane and methoxytrimethylsilane. Preference is given to tetraalkoxysilanes, particularly preferably tetramethoxysilane and tetraethoxysilane, with very particular preference being given to tetraethoxysilane.

Compounds (D) are mainly used as inhibitors of aluminium corrosion.

Tertiary Amine (E)

The at least one tertiary amine (E) bears at least one 2-hydroxyethyl- or 2-hydroxypropyl-group. Potential tertiary amines (E) may bear one, two or three 2-hydroxyethyl- or 2-hydroxypropyl-groups, preferably two or three 2-hydroxyethyl- or 2-hydroxypropyl-groups and more preferably 2-hydroxyethyl-groups.

The substituents of the tertiary amine (E) not being a 2-hydroxyethyl- or 2-hydroxypropyl-group may be aliphatic, cycloaliphatic or aromatic groups with up to 20 carbon atoms, preferably with up to 18, more preferably with up to 16, even more preferably with up to 14, and especially up to 12 carbon atoms.

These substituents are preferably aliphatic or aromatic and more preferably aliphatic.

Aromatic substituents can be e.g. phenyl, tolyl or naphthyl.

Aliphatic substituents may be linear or branched, preferred are linear alkyl substituents comprising 1 to 18 carbon atoms, preferably 2 to 16, more preferably 4 to 14, and especially 6 to 12 carbon atoms.

In the compounds (E) the substituent is preferably derived from fatty amines which are preferably obtainable by hydrogenation and amination of fatty acids and esters, particularly preferably by hydrogenation and amination of 2-ethylhexanoic acid, octanoic acid (caprylic acid), pelargonic acid (nonanoic acid), 2-propylheptanoic acid, decanoic acid (capric acid), undecanoic acid, dodecanoic acid (lauric acid), tridecanoic acid, tetradecanoic acid (myristic acid), pentadecanoic acid, palmitic acid (hexadecanoic acid), palmitoleic acid [(9Z)-hexadec-9-enoic acid], margaric acid (heptadecanoic acid), stearic acid (octadecanoic acid), oleic acid [(9Z)-octadec-9-enoic acid], elaidic acid [(9E)-octadec-9-enoic acid], linoleic acid [(9Z,12Z)-octadeca-9,12-dienoic acid], linolenic acid [(9Z,12Z,15Z)-octadeca-9,12,15-trienoic acid], eleostearic acid [(9Z,11E,13E)octadeca-9,11,13-trienoic acid], ricinoleic acid ((R)-12-hydroxy-(Z)-octadec-9-enoic acid), isoricinoleic acid [(S)-9-hydroxy-(Z)- octadec-12-enoic acid], nonadecanoic acid, arachidic acid (eicosanoic acid), behenic acid (docosanoic acid) and erucic acid [(13Z)-docos-13-enoic acid].

Examples for tertiary amines (E) bearing one 2-hydroxy-ethyl- or 2-hydroxypropyl-group and two other substituents are those of the general formula (I)

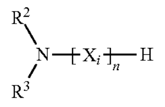

where $R^2$ and $R^3$ independently of another each are a substituent as described above, preferably a linear or branched, preferred a linear alkyl substituent comprising 1 to 18 carbon atoms, preferably 2 to 16, more preferably 4 to 14, and especially 6 to 12 carbon atoms, or together may form a five- or six-membered ring including the nitrogen atom, $X_i$ is $—CH_2—CH_2—O—$, $—CH_2—CH(CH_3)—O—$ or $—CH(CH_3)—CH_2—O—$, preferably $—CH_2—CH_2—O—$, and n is a positive integer from 1 to 5, preferably from 1 to 4, more preferably from 1 to 3, even more preferably 1 or 2, and especially 1.

Preferred individuals are dimethyl ethanolamine, dimethyl propanolamine, diethyl ethanolamine, diethyl propanolamine, di-n-butyl ethanolamine, di-n-butyl propanolamine, N-hydroxyethyl pyrrolidine, N-hydroxyethyl piperidine, and N-hydroxyethyl morpholine.

Examples for tertiary amines (E) bearing two 2-hydroxy-ethyl- or 2-hydroxypropyl-groups and one other substituent are of the general formula (II)

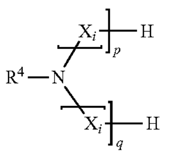

where $R^4$ is a substituent as described above, preferably a linear or branched, preferred a linear alkyl substituent comprising 1 to 18 carbon atoms, preferably 2 to 16, more preferably 4 to 14, and especially 6 to 12 carbon atoms, each Xi for i=1 to p and 1 to q is independently selected from the group consisting of $—CH_2—CH_2—O—$, $—CH_2—CH(CH_3)—O—$ or $—CH(CH_3)—CH_2—O—$, preferably $—CH_2—CH_2—O—$, and p and q independently of another are a positive integer from 1 to 5, preferably from 1 to 4, more preferably from 1 to 3, even more preferably 1 or 2, and especially 1.

Preferred individuals are the bis(2-hydroxyethyl) amines or bis(2-hydroxypropyl) amines bearing as substituent $R^4$ n-hexylamine, 2-methylpentylamine, n-heptylamine, 2-heptylamine, isoheptylamine, 1-methylhexylamine, n-octylamine, 2-ethylhexylamine, 2-aminooctane, 6-methyl-2-heptylamine, n-nonylamine, isononylamine, n-decylamine and 2-propylheptylamine or mixtures thereof.

Particular preference is given to bis(2-hydroxyethyl)-substituted n-hexylamine, n-octylamine, 2-ethylhexylamine and n-decylamine, with n-octylamine and 2-ethylhexylamine, in particular bis(2-hydroxyethyl) n-octylamine, being particularly preferred.

These compounds are preferably obtainable by reacting the corresponding amines $R^4—NH_2$ with alkylene oxides to the desired average statistical degree of alkoxylation, preferably under basic conditions. This is particularly preferred when the structural unit $X_i$ is derived from ethylene oxide or propylene oxide, preferably from ethylene oxide.

Examples for tertiary amines (E) bearing three 2-hydroxy-ethyl- or 2-hydroxypropyl-groups are triethanolamine and tripropanolamine, preferably triethanolamine.

Preferred amines (E) are dimethyl ethanolamine, dimethyl propanolamine, diethyl ethanolamine, di-n-butyl ethanolamine, N-hydroxyethyl morpholine, bis(2-hydroxyethyl) n-hexylamine, bis(2-hydroxyethyl) n-octylamine, bis(2-hydroxyethyl) 2-ethylhexylamine, bis(2-hydroxyethyl) n-decylamine, and triethanolamine.

Monocarboxylic Acid (F)

Suitable monocarboxylic acids (F) may be linear or branched-chain, aliphatic, cycloaliphatic or aromatic monocarboxylic acids with up to 20 carbon atoms, preferably with from 2 to 18, more preferably with from 5 to 16, even more preferably with from 5 to 14, most preferably with from 6 to 12, and especially with from 8 to 10 carbon atoms.

Branched-chain aliphatic monocarboxylic acids are preferred of the corresponding linear monocarboxylic acids.

Useful linear or branched-chain, aliphatic or cycloaliphatic monocarboxylic acids (F) are, for example, propionic acid, pentanoic acid, 2,2-dimethylpropanoic acid, hexanoic acid, 2,2-dimethylbutaneoic acid, cyclohexyl acetic acid, octanoic acid, 2-ethylhexanoic acid, nonanoic acid, isononanoic acid, decanoic acid, undecanoic acid or dodecanoic acid.

A suitable aromatic monocarboxylic acid (F) is in particular benzoic acid; additionally useful are also, for example, $C_1$- to $C_8$-alkylbenzoic acids such as o-, m-, p-methylbenzoic acid or p-tertbutylbenzoic acid, and hydroxyl-containing aromatic monocarboxylic acids such as o-, m- or p-hydroxybenzoic acid, o-, m- or p-(hydroxymethyl)benzoic acid or halobenzoic acids such as o-, m- or p-fluorobenzoic acid.

Especially preferred are 2-ethylhexanoic acid and isononanoic acid.

As used herein, isononanoic acid refers to one or more branched-chain aliphatic carboxylic acids with 9 carbon atoms. Embodiments of isononanoic acid used in the engine coolant composition may include 7-methyloctanoic acid (e.g., CAS Nos. 693-19-6 and 26896-18-4), 6,6-dimethylheptanoic acid (e.g., CAS No. 15898-92-7), 3,5,5-trimethylhexanoic acid (e.g., CAS No. 3302-10-1), 3,4,5-trimethylhexanoic acid, 2,5,5-trimethylhexanoic acid, 2,2,4,4-tetramethylpentanoic acid (e.g., CAS No. 3302-12-3) and combinations thereof. In a preferred embodiment, isononanoic acid has as its main component greater than 90% of one of 7-methyloctanoic acid, 6,6-dimethylheptanoic acid, 3,5,5-trimethylhexanoic acid, 3,4,5-trimethylhexanoic acid, 2,5,5-trimethylhexanoic acid, and 2,2,4,4-tetramethylpentanoic acid. The balance of the isononanoic acid may include other nine carbon carboxylic acid isomers and minor amounts of one or more contaminants. In a preferred embodiment, the isononanoic acid has as its main component greater than 90% of 3,5,5-trimethylhexanoic acid and even more preferably, the main component is greater than 95% 3,5,5-trimethylhexanoic acid.

It is possible, however disadvantageous, to use carboxylic acids with a higher functionality, e.g. di- or tricarboxylic acids, in addition to or instead of the monocarboxylic acids. The use of monocarboxylic acids has been shown to yield superior results compared to commonly used dicarboxylic acids, see examples.

If used, di- or tricarboxylic acids can be aliphatic, cycloaliphatic or aromatic, preferably aliphatic or aromatic and more preferably aliphatic with up to 20 carbon atoms, preferably with up to 18, more preferably with up to 16, even more preferably with up to 14, and especially up to 12 carbon atoms.

If used, examples of dicarboxylic acids are oxalic acid, malonic acid, succinic acid, glutaric acid, adipic acid, pimelic acid, suberic acid, azelaic acid, sebacic acid, undecanedioic acid, dodecanedioic acid, alkyl or alkenyl succinic acids, 2-metylbutane dioic acid, 2-ethylpentanedioic acid, 2-n-dodecylbutanedioic acid, 2-ndodecenylbutanedioic acid, 2-phenylbutanedioic acid, 2-(pmethylphenyl) butanedioic acid, 2,2-dimethylbutanedioic acid, 2,3-dimethylbutanedioic acid; 2,3,4 trimethylpentanedioic acid, 2,2,3-trimethylpentanedioic acid; 2-ethyl-3-methylbutanedioic maleic acid, fumaric acid, pent-2-enedioic acid, hex-2-enedioic acid; hex-3-endioic acid; 5-methylhex-2-enedioic acid; 2,3-dimethylpent-2-enedioic acid; 2-methylbut-2-enedioic acid, 2-dodecylbut-2-enedioic acid, phthalic acid, isophthalic acid, terephthalic acid and substituted phthalic acids such as 3-methylbenzene-1,2-dicarboxylic acid; 4-phenylbenzene-1,3-dicarboxylic acid; 2-(1-propenyl) benzene-1,4-dicarboxylic acid, and 3,4-dimethylbenzene-1,2-dicarboxylic acid.

If used, examples of tricarboxylic acids are benzene tricarboxylic acids (all isomers) and triazinetriiminocarboxylic acids such as 6,6',6"-(1,3,5-triazine-2,4,6-triyltriimino) trihexanoic acid.

In a preferred embodiment the coolants according to the invention do not contain any carboxylic acids with a functionality higher than 1.

Silicophosphonate (G)

As an optional constituent it is possible to use at least one silicophosphonate (G) in the coolant according to the invention.

Silicophosphonates are those of the general structure (V)

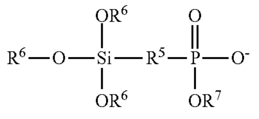

where $R^5$ is a bivalent organic residue, preferably a 1,ω-alkylene group with 1 to 6, preferably 1 to 4 carbon atoms, more preferably methylene, 1,2-ethylene, 1,2-propylene, 1,3-propylene or 1,4-butylene, most preferably 1,2-ethylene or 1,3-propylene, and especially 1,2-ethylene, $R^6$ and $R^7$ are independently of another $C_1$- to $C_4$-alkyl, preferably methyl, ethyl, n-propyl, isopropyl, n-butyl, iso-butyl, sec-butyl or tert-butyl, preferably methyl or ethyl.

Such silicophosphonates may exist as free phosphonate acid or in the form of their sodium or potassium salts, preferably sodium or potassium salt, more preferably as sodium salt.

Further Coolant Additives (H)

It is further possible to add further typical coolant additives to the coolants of the present invention, as long as they do not increase the electrical conductivity above the critical value pointed out above.

As further customary assistants, the inventive coolant may also comprise, in customary small amounts, defoamers (generally in amounts of from 0.003 to 0.008% by weight) and, for reasons of hygiene and safety in the event that it is swallowed, bitter substances (for example of the denatonium benzoate type) and dyes.

Wherever possible the use of non-ionic additives is preferred over ionic alternatives as long as a similar effect can be achieved using the non-ionic additives.

Composition

Main requirement of the coolants according to the present invention is that the coolants should exhibit an electrical conductivity at 25° C. of less than 50, preferably less than 45 μS/cm (determined according to ASTM D 1125) to make the suitable for cooling systems of vehicles with electric engines.

In order to achieve that purpose the amount of ionic species, species which may contain ionic byproducts or combination of species which may form ions, such as acids and bases, should be kept at a minimum in order not to raise the electrical conductivity over the critical value.

Therefore, the amount of components (C) to (H) in the coolant are chosen in a way that the critical value for the electrical conductivity is not exceeded.

In order to keep combinations of ion-forming species at a minimum the molar ratio between tertiary amine (E) and monocarboxylic acid (F) is from 1:0.1 to 1:0.6, preferably from 0.15 to 0.5 and more preferably from 0.2 to 0.4.

Reference is the number amount of amino-respectively carboxylic acid groups in compounds (E) respectively (F) in case molecules are used with a functionality higher than 1.

Typically, the coolants according to the invention are composed as follows:

(A) at least one glycol: 10 to 90 wt %, preferably 20 to 80 wt %, more preferably 30 to 70 wt %

(B) water: 10 to 90 wt %, preferably 20 to 80 wt %, more preferably 30 to 70 wt %

(C) at least one azole derivative: 0.01 to 1 wt %, preferably 0.02 to 0.9 wt %, more preferably 0.03 to 0.8 wt %, even more preferably 0.04 to 0.5, especially 0.05 to 0.3 wt %

(D) at least one ester of orthosilicic acid or alkoxy alkylsilane: 0.01 to 1 wt %, preferably 0.02 to 0.9 wt %, more preferably 0.03 to 0.8 wt %, even more preferably 0.04 to 0.5, especially 0.05 to 0.3 wt %

(E) at least one tertiary amine bearing at least one 2-hydroxyethyl- or 2-hydroxypropyl-group: 0.01 to 1 wt %, preferably 0.015 to 0.9 wt %, more preferably 0.02 to 0.8 wt %

(F) at least one monocarboxylic acid: 0.01 to 1 wt %, preferably 0.015 to 0.8 wt %, more preferably 0.02 to 0.6 wt %

(G) optionally at least one silicophosphonate: 0 to 1 wt %, preferably 0.01 to 0.8 wt %, more preferably 0.02 to 0.6 wt %

(H) optionally at least on further coolant additive: 0 to 0.5 wt % for each further coolant additive, preferably 0.01 to 0.4 wt %, more preferably 0.02 to 0.3 wt %.

with the proviso that the sum of all components always add up to 100 wt %.

A further embodiment of the present invention are coolant concentrates. Coolants usually are obtained from coolant concentrates by dilution with water (B). Hence, the coolant concentrates usually contain little or no water (B).

Typically, the coolant concentrates according to the invention are composed as follows:

(A) at least one glycol: 50 to 99.9 wt %, preferably 60 to 99.8 wt %, more preferably 75 to 99.7 wt %

(B) water: 0 to 10 wt %, preferably 0 to 8 wt %, more preferably 0 to 5 wt %

(C) at least one azole derivative: 0.02 to 1 wt %, preferably 0.04 to 0.8 wt %, more preferably 0.06 to 0.6 wt %, even more preferably 0.08 to 0.5, especially 0.1 to 0.4 wt %

(D) at least one ester of orthosilicic acid or alkoxy alkylsilane: 0.02 to 1 wt %, preferably 0.04 to 0.8 wt %, more preferably 0.06 to 0.6 wt %, even more preferably 0.08 to 0.5, especially 0.1 to 0.4 wt %

(E) at least one tertiary amine bearing at least one 2-hydroxyethyl- or 2-hydroxypropyl-group: 0.02 to 0.8 wt %, preferably 0.03 to 0.6 wt %, more preferably 0.04 to 0.5 wt %

(F) at least one monocarboxylic acid: 0.01 to 0.5 wt %, preferably 0.02 to 0.3 wt %, more preferably 0.03 to 0.2 wt %

(G) optionally at least one silicophosphonate: 0 to 1 wt %, preferably 0.02 to 0.8 wt %, more preferably 0.04 to 0.6 wt %

(H) optionally at least on further coolant additive: 0 to 0.5 wt % for each further coolant additive, preferably 0.002 to 0.4 wt %, more preferably 0.004 to 0.3 wt %.

with the proviso that the sum of all components always add up to 100 wt %.

A further embodiment of the present invention are coolant super concentrates. Coolant concentrates usually are obtained from coolant super concentrates by dilution with the glycol (A), respectively coolants may be obtained from coolant super concentrates by dilution with the glycol (A) and water (B). Hence, the coolant concentrates usually contain little or no water (B) and little or no glycol (A).

Typically, the coolant super concentrates according to the invention are composed as follows:

(A) at least one glycol: 70 to 99.5 wt %, preferably 80 to 99 wt %, more preferably 90 to 98 wt %

(B) water: 0 to 10 wt %, preferably 0 to 8 wt %, more preferably 0 to 5 wt %

(C) at least one azole derivative: 0.05 to 5 wt %, preferably 0.1 to 4 wt %, more preferably 0.2 to 3 wt %, even more preferably 0.3 to 2, especially 0.4 to 1.5 wt %

(D) at least one ester of orthosilicic acid or alkoxy alkylsilane: 0.05 to 5 wt %, preferably 0.1 to 4 wt %, more preferably 0.2 to 3 wt %, even more preferably 0.3 to 2, especially 0.4 to 1.5 wt %

(E) at least one tertiary amine bearing at least one 2-hydroxyethyl- or 2-hydroxypropyl-group: 0.1 to 4 wt %, preferably 0.15 to 3 wt %, more preferably 0.2 to 2.5 wt %

(F) at least one monocarboxylic acid: 0.05 to 1 wt %, preferably 0.1 to 0.9 wt %, more preferably 0.2 to 0.8 wt %

(G) optionally at least one silicophosphonate: 0 to 5 wt %, preferably 0.02 to 4 wt %, more preferably 0.04 to 3 wt %

(H) optionally at least on further coolant additive: 0 to 1 wt % for each further coolant additive, preferably 0.005 to 0.8 wt %, more preferably 0.008 to 0.6 wt %.

with the proviso that the sum of all components always add up to 100 wt %.

Because of their low electrical conductivity the coolants according to the present invention may be used in cooling systems of vehicles with electric engines, fuel cells or hybrid engines with a combination of combustion engines with electric engines or a combination of combustion engines with fuel cells.

EXAMPLES

The invention is illustrated in the following examples, but without it being restricted thereto.

Coolant compositions were prepared by mixing the constituents as listed in Table 1 (all amounts given in weight %) and the features and physical parameters as pointed out in Table 1 were determined as follows:

| Appearance | Visual |
|---|---|
| Water, % | DIN 51777 |
| Density at 20° C., g/cm3 | DIN 51757 |
| pH as-is | ASTM D 1287 |
| Reserve alkalinity of 10 mL, mL 0.1 mol/L HCl | ASTM D 1121 |
| Refractive index at 20° C. | DIN 51423 |
| Conductivity at 25° C., μS/cm | ASTM D 1125 |

Examples 2, 4, 5, and 6 are for comparative purposes, Examples 1, 3, 7, and 8 are according to the invention.

The coolants were brought to a slightly alkaline pH-value using different bases in order to ensure a sufficient reserve alkalinity which is necessary to buffer acidic degradation products of the coolant.

It can easily be seen that the use of the strong bases potassium and sodium hydroxide (Comparative Examples 4 and 5) in order to achieve the target pH-value due to their full dissociation raise the electrical conductivity to an unacceptable high value.

Using di isopropyl amine as base (Comparative Example 2) lowers the electrical conductivity, however, it still remains above the critical value of 50 μS/cm. This critical value is achieved only the bases (E) according to the invention (octyl diethanol amine in Example 3 and preferably triethanolamine in Example 1).

Variation of the carboxylic acids shows that use of the dicarboxylic acid sebacic acid (Comparative Example 6) leaves the electrical conductivity above the critical value of 50 μS/cm. The aromatic monocarboxylic acid benzoic acid (Example 8) yields good values with the aliphatic monocarboxylic acids ethylhexanoic acid (Example 7) and especially isononanoic acid (Example 1) being most preferred.

TABLE 1

| Raw material | Ex 1 | Ex 2 (Comp) | Ex 3 | Ex 4 (Comp) | Ex 5 (Comp) | Ex 6 (Comp) | Ex 7 | Ex 8 |
|---|---|---|---|---|---|---|---|---|
| Monoethylene glycol | 49.89 | 49.92 | 49.86 | 49.91 | 49.93 | 49.88 | 49.89 | 49.89 |
| Pure water (distilled) | 49.81 | 49.81 | 49.81 | 49.81 | 49.81 | 49.81 | 49.81 | 49.81 |
| Tolutriazole | 0.1 | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 | 0.1 |
| Triethanol amine (85%) | 0.08 | | | | | 0.08 | 0.08 | 0.08 |

TABLE 1-continued

| Raw material | Ex 1 | Ex 2 (Comp) | Ex 3 | Ex 4 (Comp) | Ex 5 (Comp) | Ex 6 (Comp) | Ex 7 | Ex 8 |
|---|---|---|---|---|---|---|---|---|
| Isononanoic acid | 0.02 | 0.02 | 0.02 | 0.02 | 0.02 | | | |
| Di isopropyl amine | | 0.05 | | | | | | |
| Octyl diethanol amine | | | 0.11 | | | | | |
| Potassium hydroxide (KOH), 48% | | | | 0.06 | | | | |
| Sodium hydroxide (NaOH), 50% | | | | | 0.04 | | | |
| Sebacic acid | | | | | | 0.03 | | |
| Ethylhexanoic acid | | | | | | | 0.02 | |
| Benzoic acid | | | | | | | | 0.02 |
| Total | 100 | 100 | 100 | 100 | 100 | 100 | 100 | 100 |
| Appearance | clear, colorless | clear, colorless | clear, colorless | clear, colorless | clear, colorless | clear, colorless | clear, colorless | clear, colorless |
| Water, % | 50.3 | 50.5 | 50.3 | 49.8 | 48.5 | 50.7 | 50.1 | 50.1 |
| Density at 20° C., g/cm3 | 1.065 | 1.065 | 1.065 | 1.065 | 1.065 | 1.065 | 1.065 | 1.065 |
| pH as-is | 7.7 | 8.2 | 8.2 | 8.6 | 8.6 | 7.3 | 7.7 | 7.8 |
| Reserve alkalinity of 10 mL, mL 0.1 mol/L HCl | 0.4 | 0.4 | 0.5 | 0.5 | 0.4 | 0.3 | 0.5 | 0.4 |
| Refractive index at 20° C. | 1.384 | 1.384 | 1.384 | 1.383 | 1.384 | 1.384 | 1.384 | 1.384 |
| Electr. Conductivity, µS/cm | 40 | 54 | 50 | 166 | 135 | 73 | 41 | 43 |

Corrosion Examples

The coolant compositions of Example 1 and the composition of Example 1 further comprising 0.01 wt % of a silicophosphonate (Formula (V), $R^5$=1,3-propylene, $R^6$, $R^7$=methyl and ethyl (statistical mixture), sodium salt) were compared in corrosion tests according to ASTM D 1384 at 88° C.

Values for pH, reserve alkalinity, electrical conductivity, and silicon content were determined before and after the corrosion test.

| Sample Weight change, mg/cm$^2$ | Ex. 1 | Ex. 1 + 0.01% silicophosphonate (38% in water) |
|---|---|---|
| Copper | 0.06 | 0.04 |
| Steel H-II | 0.02 | 0.02 |
| Steel 1.4301 | 0.05 | 0.07 |
| Cast aluminum G-ALSi6Cu4 | 0 | −0.01 |
| pH before test | 7.82 | 7.74 |
| pH after test | 7.64 | 7.71 |
| pH change, % | −2% | 0% |
| RA before test (mL 0.1 mol/L HCl) | 0.45 | 0.46 |
| RA before test (mL 0.1 mol/L HCl) | 0.38 | 0.41 |
| RA change, % | −16% | −11% |
| Conductivity before test (µS/cm) | 39.2 | 41.2 |
| Conductivity after test (µS/cm) | 51.5 | 51.5 |
| Conductivity change, % | 31% | 25% |
| Si calculated before test (ppm) | 135 | 140 |
| Si after test (ppm) | 42 | 70 |
| Si change (%) | −69% | −50% |

While the results of the corrosion test and pH-value are comparable within the accuracy of measurement, the drop of reserve alkalinity and loss of silicon content is less distinctive in the presence of the silicophosphonate than in its absence.

It is, therefore, preferred that the coolants contain at least one silicophosphonate which reduces the consumption of tetraethoxysilane which acts as an inhibitor of aluminium corrosion.

The invention claimed is:

1. A coolant, comprising:

(A) at least one glycol, (B) water, (C) at least one azole derivative, (D) at least one ester of orthosilicic acid or alkoxy alkylsilane, (E) at least one tertiary amine bearing at least one 2-hydroxyethyl- or 2-hydroxypropyl-group, (F) at least one monocarboxylic acid, (G) optionally, at least one silicophosphonate, and (H) optionally, at least one further coolant additive, wherein a molar ratio between the at least one tertiary amine (E) and the at least one monocarboxylic acid (F) is from 1:0.1 to 1:0.6, and components (C) to (H) are present in amounts so that the coolant exhibits an electrical conductivity of less than 50 µS/cm.

2. The coolant according to claim 1, wherein the at least one glycol (A) is selected from the group consisting of monoethylene glycol, diethylene glycol, triethylene glycol, tetraethylene glycol, monopropylene glycol, dipropylene glycol, 1,3-propanediol, a higher poly alkylene glycol, an alkylene glycol ether, and glycerol.

3. The coolant according to claim 1, wherein the at least one azole derivative (C) is selected from the group consisting of benzimidazole, benzotriazole, tolutriazole, hydrogenated tolutriazole, (2-benzothiazylthio) acetic acid, and (2-benzothiazylthio) propionic acid.

4. The coolant according to claim 1, wherein the at least one ester of orthosilicic acid (D) is orthosilicic acid tetra ethyl ester or orthosilicic acid tetra methyl ester.

5. The coolant according to claim 1, wherein the at least one tertiary amine (E) is selected from the group consisting of a compound of the general formula (I)

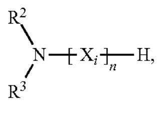

wherein $R^2$ and $R^3$ independently of another each are a linear or branched alkyl substituent comprising 1 to 18 carbon atoms, or together form a five- or six-membered ring including the nitrogen atom, $X_i$ is $—CH_2—CH_2—O—$, $—CH_2—CH(CH_3)—O—$ or $—CH(CH_3)—CH_2—O—$, and n is a positive integer from 1 to 5, a compound of the general formula (II)

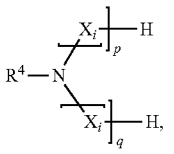

wherein $R^4$ is a linear or branched alkyl substituent comprising 1 to 18 carbon atoms, each Xi for i=1 to p and 1 to q, is independently selected from the group consisting of $—CH_2—CH_2—O—$, $—CH_2—CH(CH_3)—O—$, and $—CH(CH_3)—CH_2—O—$, and p and q independently of another are a positive integer from 1 to 5, and a tertiary amine bearing three 2-hydroxyethyl- or 2-hydroxypropyl-groups.

6. The coolant according to claim 5, wherein the at least one tertiary amine (E) is of the general formula (I), and is at least one selected from the group consisting of dimethyl ethanolamine, dimethyl propanolamine, diethyl ethanolamine, diethyl propanolamine, di-n-butyl ethanolamine, di-n-butyl propanolamine, N-hydroxyethyl pyrrolidine, N-hydroxyethyl piperidine, and N-hydroxyethyl morpholine.

7. The coolant according to claim 5, wherein the at least one tertiary amine (E) is of the general formula (II), and is a bis(2-hydroxyethyl) amine or bis(2-hydroxypropyl) amine bearing as substituent $R^4$ n-hexyl, 2-methylpentyl, n-heptyl, 2-heptyl, isoheptyl, 1-methylhexyl, n-octyl, 2-ethylhexyl, 2-octyl, 6-methyl-2-heptyl, n-nonyl, isononyl, n-decyl and 2-propylheptyl or a mixture thereof.

8. The coolant according to claim 5, wherein the at least one tertiary amine (E) is the tertiary amine bearing three 2-hydroxyethyl- or 2-hydroxypropyl-groups, and is selected from the group consisting of triethanolamine and tripropanolamine.

9. The coolant according to claim 5, wherein in the compound of the general formula (I), $R^2$ and $R^3$ are independently of another a linear alkyl substituent comprising 6 to 12 carbon atoms.

10. The coolant according to claim 5, wherein in the compound of the general formula (I), n is 1.

11. The coolant according to claim 5, wherein in the compound of the general formula (II), $R^4$ is a linear alkyl substituent comprising 6 to 12 carbon atoms.

12. The coolant according to claim 5, wherein in the compound of the general formula (II), p and q are 1.

13. The coolant according to claim 1, wherein the at least one monocarboxylic acid (F) is aliphatic, aromatic or cycloaliphatic.

14. The coolant according to claim 13, wherein the at least one monocarboxylic acid (F) is aliphatic with 5 to 14 carbon atoms.

15. The coolant according to claim 1, wherein the at least one monocarboxylic acid (F) is linear or branched.

16. The coolant according to claim 1, wherein the at least one monocarboxylic acid (F) is selected from the group consisting of 2-ethylhexanoic acid and isononanoic acid.

17. The coolant according to claim 1, wherein no carboxylic acids with a functionality of more than 1 are present.

18. The coolant according to claim 1, wherein a water content is not more than 5 wt %.

19. The coolant according to claim 1, wherein components (C) to (H) are present in amounts so that the coolant exhibits an electrical conductivity of less than 45 μS/cm.

20. A method of cooling a vehicle, the method comprising:

adding a coolant into a cooling system of a vehicle with an electric engine, fuel cell, or hybrid engine with a combination of a combustion engine with an electric engine or a combination of a combustion engine with a fuel cell;

wherein the coolant comprises:

(A) at least one glycol, (B) water, (C) at least one azole derivative, (D) at least one ester of orthosilicic acid or alkoxy alkylsilane, (E) at least one tertiary amine bearing at least one 2-hydroxyethyl- or 2-hydroxypropyl-group, (F) at least one monocarboxylic acid, (G) optionally, at least one silicophosphonate, and (H) optionally, at least one further coolant additive, wherein a molar ratio between the at least one tertiary amine (E) and the at least one monocarboxylic acid (F) is from 1:0.1 to 1:0.6, and components (C) to (H) are present in amounts so that the coolant exhibits an electrical conductivity of less than 50 μS/cm.

* * * * *